Oct. 26, 1954 W. B. SMITH 2,692,469
COTTON HARVESTING UNIT
Filed Jan. 15, 1951 2 Sheets-Sheet 1

Inventor
William Burris Smith
By
ATTORNEY

Oct. 26, 1954  W. B. SMITH  2,692,469
COTTON HARVESTING UNIT
Filed Jan. 15, 1951  2 Sheets-Sheet 2

Inventor
William Burris Smith
By
ATTORNEY

Patented Oct. 26, 1954

2,692,469

UNITED STATES PATENT OFFICE 2,692,469

COTTON HARVESTING UNIT

William Burris Smith, Greenville, Miss., assignor of one-half to Hugh A. Gamble, Greenville, Miss.

Application January 15, 1951, Serial No. 206,040

2 Claims. (Cl. 56—47)

This invention relates to rotating spindle type cotton pickers and more particularly to an improved doffing mechanism for such pickers.

The spindle type cotton picker as shown, for example, in Patent 1,747,566 issued to Hiram N. Berry, February 18, 1930, comprises a plurality of rotary picking spindles supported by and projecting from a rotary drum or cylinder. The drum is rotated on a vertical axis and moved along the side of a row of cotton plants while rows of rotary picking spindles are successively projected into the plants to wind off the cotton. In the Berry patent construction the picked cotton on the spindles is removed or doffed from the spindles by vertical stripper bars moved along the spindles after the spindles pass out of the plants. The present invention provides a doffing mechanism which holds or stabilizes the picked cotton while the spindle is loosened and withdrawn from the picked cotton.

It is an object of this invention to provide an improved doffing mechanism which avoids the use of stripper bars and/or rotary brushes.

It is another object of this invention to provide a doffing mechanism effective to completely remove picked cotton from the picking spindles.

It is another object of this invention to provide a doffing mechanism which includes a plurality of elements interfitting between and engaging both sides of the cotton on the spindles of a vertical row of cotton-loaded spindles to hold and stabilize the cotton while the spindles are loosened and withdrawn from the cotton.

It is another object of this invention to provide a doffing mechanism in which an improved spindle carrier draws rows of cotton-loaded spindles between a series of cotton stabilizing elements.

It is another object of this invention to provide an improved spindle drive mechanism which gives the loaded spindles a slight reverse rotation as they are drawn through the doffing mechanism.

It is a still further object of this invention to provide an improved spindle drive mechanism utilizing friction drive belts to rotate the picking spindles after they have penetrated the cotton plants and to reversely rotate the loaded spindles after they have left the plants and have engaged the improved doffing mechanism.

It is a still further object of this invention to provide a doffing mechanism with a rotary clearing device.

Other objects and advantages of this invention will be readily apparent to those skilled in the art from examination of the following description of a preferred construction illustrated diagrammatically in the accompanying drawings wherein.

Figure 1:
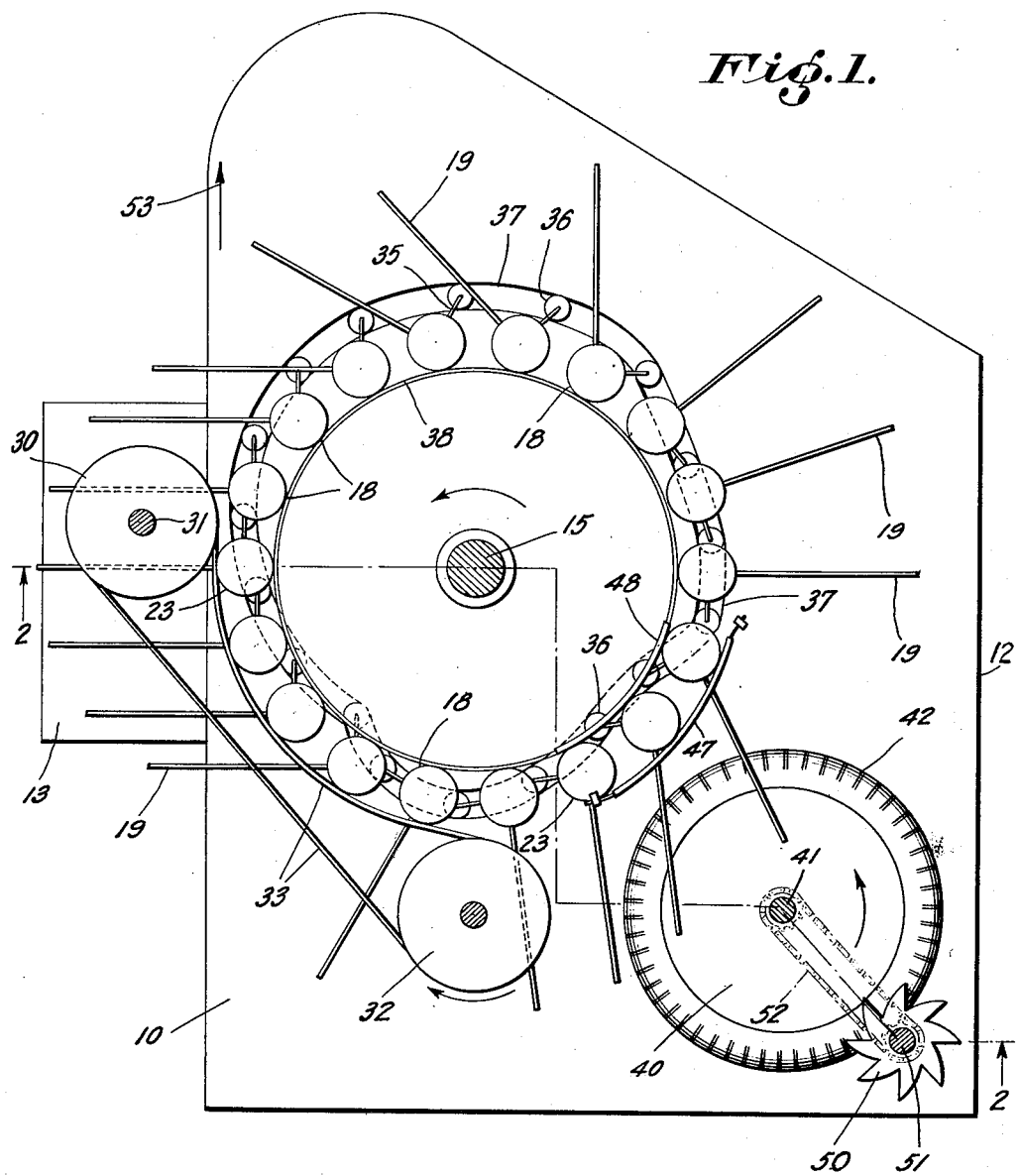
Figure 1 is a plan view with parts broken away and shown in section illustrating the principal mechanisms of a cotton picker unit embodying my invention.

For the sake of simplicity and clearness, some details and duplicated elements are omitted from the diagrammatic illustrations.

Referring to the diagrammatic drawings for the purposes of illustration, the base or floor of a cotton picker unit is indicated by the numeral 10. A top plate 11 may be secured to the base 10 by sides 12 and by a suitable framework not shown. The entire unit may be suspended from the top plate 11, which may be flexibly connected to arms secured to a tractor or vehicle as is well known in the art. The top plate 11 may have a projecting portion 13 to cover the projecting spindle drive pulley hereinafter to be described.

A rotary shaft 15 extends from a bearing in or supported by the base 10 vertically upward through the top 11 where it is connected by a gear of chain drive to a suitable source of power, not shown. The shaft 15 has a disc 16 secured thereto near the base 10, and the disc is provided near its periphery with a plurality of recesses 17. A series of vertical tubular housings 18 are provided and are supported by the disc 16, the lower end of each housing 18 being loosely seated in a recess 17. Each housing 18 is provided with a series of projecting cotton picking spindles 19. The circular series of housings 18 form a cage-like unit rotating about the vertical axis of shaft 15 to successively project and retract vertical rows of spindles 19 into and out of cotton plants as the unit passes along the side of a row of cotton plants. A typical picking unit may include a cage composed of eighteen housings 18, each housing carrying fourteen spindles, making a total of two hundred and fifty-two picking spindles per unit. A cotton picker may include two such units arranged in tandem.

Figure 2:
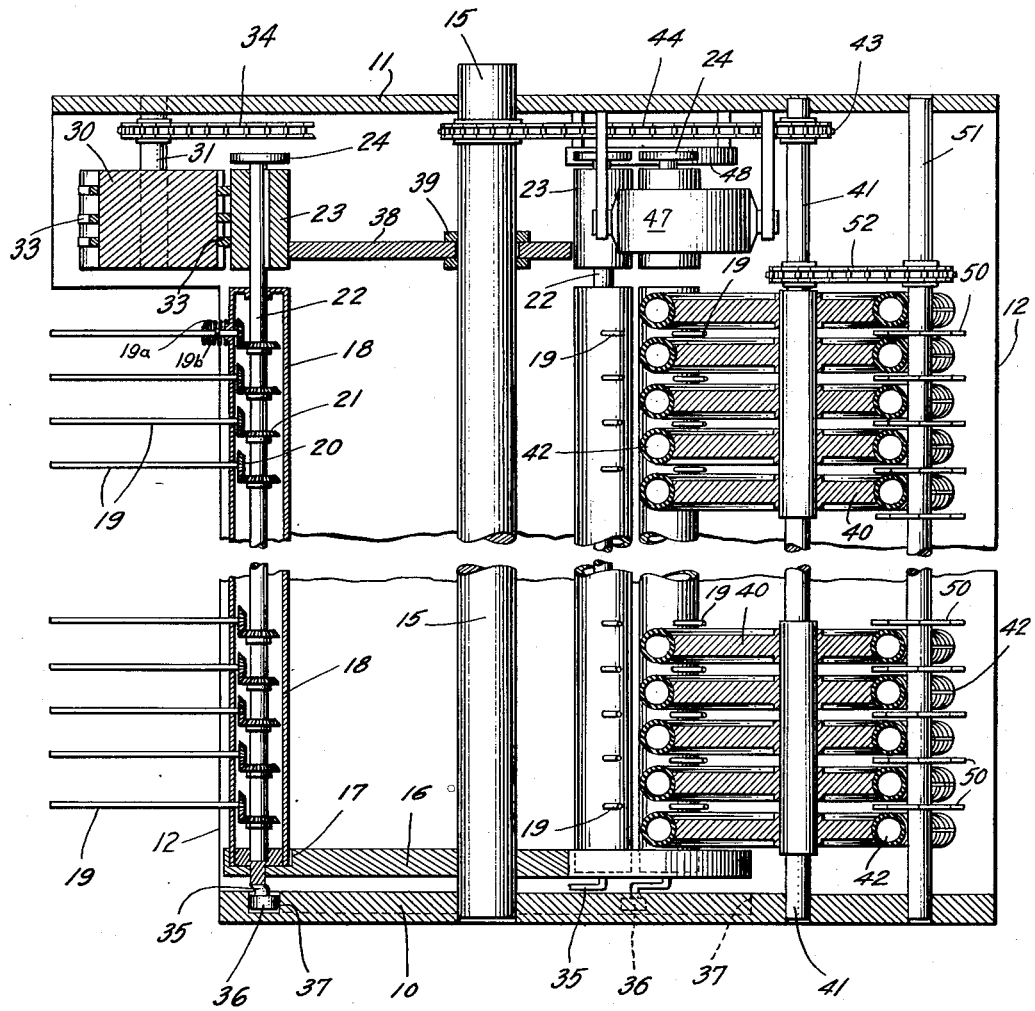
Figure 2 is a fragmentary vertical sectional view taken on line 2—2 of Figure 1.

The spindles 19 are preferably of the flexibly mounted type driven through a universal joint drive connection. In such construction, the outer or picking portion of the spindle 19 is supported by a coil spring 19a extending outward from the housing 18, and the spindle is connected to its inner driven portion by a universal joint connection 19b. Each spindle 19 is driven by its bevel gear 20 engaging a gear 21 mounted on the shaft 22 within the tubular housing 18. Suitable bearings are provided in the housing 18 for the shaft 22, and a drive pulley 23 is secured to the top of the shaft 22 above the housing 18. A rotatable roller 24 may be provided at the top end of the shaft 22 above the pulley 23. At the top of the cotton picker unit a pulley 30 is supported on a shaft 31 journaled in the projecting portion 13 of the top plate 11. A similar pulley 32 is supported in a similar manner rearward of the central shaft 15. Pulley 30 or pulley 32 may be adjustably supported to provide for adjustment of the tension of belts 33. The pulleys 30 and 32 are provided with grooves to receive a plurality of endless V-type belts 33 which extend around the pulleys and engage the pulleys 23 of those housings 18 having their spindles 19 penetrated into cotton plants. The shaft 32 may be driven by a chain drive 34 indicated partially in Figure 2 and connected to the power source which drives central shaft 15. To simplify the illustrative drawings, only three belts 33 are shown in Figure 2. It will be obvious to those skilled in the art that more or less than three parallel belts may be used. The outer surfaces of the belts frictionally engage pulleys 23 for rotating the shafts 22 and spindles 19 as the latter are withdrawn from the cotton plants. A wheel 38 is supported on the drive shaft 15 between collars 39 so that the wheel 38 is free to rotate with respect to the shaft. The periphery of wheel 38 engages the driven pulleys 23 during the time the pulleys are engaged by the driving belts 33. The freely turning wheel 38 absorbs the inward radial thrust of the driving belts and relieves the shafts 22 and their bearings in the housings 18 from all stresses except driving torque. After a driven pulley 23 passes beyond the range of contact with belt 33, the housing 18 may be biased radially outward by suitable springs so that its pulley 23 is no longer in contact with the periphery of wheel 38. As mentioned heretofore, the lower ends of the housings 18 are loosely seated in recesses 17 in the driven disc 16, so that the top of the housing 18 and its pulley 23 is permitted to swing slightly off vertical. The housings swing inward when the drive belts 33 urge the pulleys 23 against the free wheel 38, and may swing outward away from contact with the wheel 38 when beyond the limited extent of the driving belts 33.

Each tubular housing 18 is provided at its lower end with a rigid arm 35 secured thereto and extending below the disc 16, the arms 35 projecting laterally from the vertical axis of the shaft 22 in a direction at right angles to the axis of the spindle 19. The outer end of the arm 35 carries a roller 36 which engages a cam track 37 in or secured to the base plate 10. The cam track 37, as shown diagrammatically in Figure 1, extends forwardly of the path of travel of the housings 18 on the forward side of the unit, and extends rearwardly of the path of travel of the housings 18 on the rearward side of the unit. The shape of the cam track 37 is such as to slightly turn the housings in their circular path of travel about the shaft 15 so that the vertical rows of spindles 19 penetrate into the cotton plants and are withdrawn from the cotton plants in a substantially parallel row relationship as the picker moves along the side of a row of cotton plants. The cam track 37 is also shaped to move the housings 18 so that the loaded spindles 19 are drawn through the doffing mechanism hereinafter described. The friction belts 33 engage the pulleys 23 after a row of spindles has fully penetrated the plants and continues to rotate that row of spindles while it is being withdrawn from the plants.

The doffing mechanism includes a vertical series of members comprising disc-like elements 40 spaced along and secured to a support in the form of a vertical shaft 41, the latter being journaled in bearings in the top plate 11 and bottom plate 10. The discs or wheels 40 may be provided with rubber wheels or tires 42 mounted thereon, the tires 42 being similar to or like vehicle tires. The side walls of said tires 42 constitute annular surface portions of said members for engagement with cotton fibers on the spindles 19. The tires or wheels 42 may be of metal, wood or molded plastic material instead of rubber. The tires 42 may have a conventional tread and preferably have radial grooves extending over the side faces to facilitate holding or stabilizing cotton fibers brought therebetween by the spindles 19. The supporting shaft 41 may be rotated by a drive sprocket 43 connected to the driven shaft 15 by a chain drive 44 or the like. The spacing between the tires 42 is such that when a spindle 19 loaded with cotton fibers is drawn between two adjacent tires, the tires will engage the cotton on both sides of the spindle and hold or stabilize the cotton. To assist in loosening the stabilized cotton on a loaded spindle 19, a stationary belt 47 is mounted in the upper part of the unit for engagement with friction pulleys 23 on housings 18 whose spindles 19 are drawn between tires 42. A stationary segmental cam 48 is rigidly supported near the top of the unit to engage the free rollers 24 above the top of such housings to swing the top of the housings 18 outward so the pulleys 23 will positively engage the fixed belt 47. The latter causes the pulleys 23 to slowly rotate the spindles a partial turn in a reverse direction of rotation to the winding rotation effected by belts 33, whereby the cotton fibers wound on the spindles are partially unwound or loosened from the spindle barbs as the spindle passes between tires 42. The vertical distance between tires 42 should be slightly greater than the maximum diameter of the spindle 19.

The doffing assembly may be provided with a clearing mechanism comprising a series of notched discs 50 mounted on the vertical shaft 51, there being a disc 50 extending between each pair of doffing tires 42 to remove cotton fibers from between the tires. The shaft 51 is mounted for rotation in suitable bearings in the bottom plate 10 and the top plate 11, and may be connected to the shaft 41 by a driving chain 52 extending between sprockets on the shafts.

Referring to the diagrammatic illustration of Figure 1, during operation of the picking unit, the unit moves forward along the side of a row of cotton plants in the direction indicated by arrow 53. In operation, the shaft 15 is driven counterclockwise turning the disc 16 counterclockwise to move the spindle housings 18 counter-clockwise around a circular path. The cam 37 turns the housings 18 so that the vertical rows of spindles 19 penetrate into the sides of cotton plants in substantially parallel rows. After a vertical row of spindles has fully penetrated a plant, the drive belts 33 driven clockwise engage the pulleys 23 to rotate those spindles. Rotation of the spindles ceases when a row of spindles reaches the rearward side of the unit and pulley 23 passes beyond the belt pulley 32. The doffing tires 42 may be rotated counterclockwise, and when the loaded spindles enter between adjacent tires, the pulley 23 connected thereto is urged against the stationary belt 47 by cam 48 engaging rollers 24, this causing the loaded spindles to be rotated about half a turn in a reverse direction which tends to unwind and loosen the cotton fibers from the spindles. The engagement of tires 42 with both the top and bottom sides of the cotton on the spindles causes the cotton to be loosened and held while the spindles are drawn out of the cotton. The loose cotton fibers are thrown outward by the rotating tires 42, which are further cleared by the rotating clearing discs 50. The loose cotton may be collected by suitable shields and pneumatic blowers, not shown, which convey the loose cotton fibers to receptacles carried by the picking unit, as is well known in the art.

The limited reversal of the spindles and the partial unwinding of the cotton, together with the stabilizing engagement of the tires with the cotton fibers on both the top and bottom side of each spindle has been found particularly effective to completely release the cotton from the spindles. The flexible spindles disclosed in my copending application are particularly effective when used with the present form of doffing mechanism. Engagement of the doffing elements with both the top and bottom sides of the cotton fibers on the spindles has been found to be considerably more effective than rotary brushes or stripper bars. The friction belt drive for the spindle rows has also been found superior to the gear and/or chain drives heretofore used because the friction permits slippage without breakage if a spindle becomes jammed or locked.

This invention contemplates the use of various forms of bearings, supports, drive connections, and the like, as it will be readily apparent to those skilled in this art that many such variations are possible within the scope of the following claims defining my invention.

I claim:

1. In a cotton picker movable along a row of cotton plants and having a plurality of vertical rows of rotatable picking spindles movable in a substantially circular path to project rows of spindles into said plants and withdraw rows of cotton-loaded spindles from said plants, the combination comprising a tubular supporting member for each row of spindles, a driven rotary carrier mounted on said picker for supporting said plurality of tubular members, said carrier loosely engaging each tubular member at the bottom of each tubular member, a rotatable shaft in each tubular supporting member gear-connected to each spindle of the row supported by said member, a pulley secured adjacent to the upper end of said shaft, a free roller supported at the upper end of said shaft above said pulley, a driven belt frictionally engageable with said pulley to rotate said spindles in the cotton plants, a rotatable wheel supported by said carrier engageable by said rollers to absorb the lateral thrust of said belt, a doffing mechanism mounted on said picker and including a driven rotary vertical shaft and a plurality of doffing members mounted in spaced relation along said shaft engaging the upper and the lower sides of the cotton on cotton-loaded spindles out of said cotton plants, a stationary friction belt mounted on said picker adjacent said doffing mechanism engaging said pulleys to reversely rotate said cotton-loaded spindles between said doffing members, and a stand-off cam mounted on said picker opposite to said stationary belt to engage said rollers for urging said pulleys against said stationary belt.

2. In a cotton picker as defined in claim 1, each of said spindles being flexibly supported by said tubular supporting member and being connected by a universal joint and a gear to a gear on said rotatable shaft.

References Cited in the file of this patent

UNITED STATES PATENTS

| Number | Name | Date |
|---|---|---|
| 798,651 | Appleby | Sept. 5, 1905 |
| 891,444 | Scherling | June 23, 1908 |
| 928,676 | Houghton | Jan. 24, 1911 |
| 1,004,835 | White | Oct. 3, 1911 |
| 1,727,708 | Johnston | Sept. 10, 1929 |
| 1,747,566 | Berry | Feb. 18, 1930 |
| 1,801,996 | Benjamin | Apr. 21, 1931 |
| 1,802,022 | Johnston et al. | Apr. 21, 1931 |